United States Patent
Sekine

(10) Patent No.: US 10,802,769 B2
(45) Date of Patent: Oct. 13, 2020

(54) PRINTING APPARATUS CONFIGURED TO PROCESS JOB AND METHOD OF CONTROLLING THE SAME

(71) Applicant: CANON KABUSHIKI KAISHA, Tokyo (JP)

(72) Inventor: Hiroshi Sekine, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/369,129

(22) Filed: Mar. 29, 2019

(65) Prior Publication Data

US 2019/0310809 A1    Oct. 10, 2019

(30) Foreign Application Priority Data

Apr. 5, 2018    (JP) .................. 2018-073491

(51) Int. Cl.
*G06F 3/12* (2006.01)

(52) U.S. Cl.
CPC .......... *G06F 3/1207* (2013.01); *G06F 3/1204* (2013.01); *G06F 3/1235* (2013.01); *G06F 3/1259* (2013.01); *G06F 3/1274* (2013.01)

(58) Field of Classification Search
CPC .... G06F 3/1207; G06F 3/1204; G06F 3/1274; G06F 3/1235; G06F 3/1259
See application file for complete search history.

(56) References Cited

U.S. PATENT DOCUMENTS

| | | | |
|---|---|---|---|
| 2008/0151298 A1* | 6/2008 | Kurotsu | G06F 3/1207 358/1.15 |
| 2014/0036297 A1* | 2/2014 | Arai | G06K 15/4095 358/1.14 |
| 2017/0090829 A1* | 3/2017 | Mutsuno | G06F 3/1234 |

FOREIGN PATENT DOCUMENTS

JP    201787591 A    5/2017

* cited by examiner

*Primary Examiner* — Neil R McLean
(74) *Attorney, Agent, or Firm* — Canon U.S.A., Inc. IP Division

(57) ABSTRACT

A printing apparatus includes a reception unit configured to receive a print job, and an execution unit configured to execute printing the print job received by the reception unit, wherein the execution unit is configured to execute cancellation for automatically cancelling printing of the print job received by the reception unit based on a state in which a predetermined interruption of printing the print job remains unsolved continues for a predetermined time or longer; and a notification unit configured to notify at least a user or an external apparatus communicating with the printing apparatus of information indicating that the printing apparatus is currently in a state in which a print job to be newly received by the reception unit is automatically cancelled by the cancellation.

20 Claims, 10 Drawing Sheets

PRINTING APPARATUS CONFIGURED TO PROCESS JOB AND METHOD OF CONTROLLING THE SAME

BACKGROUND

Field of the Disclosure

The present disclosure relates to a printing apparatus configured to process a job and a method of controlling the same.

Description of the Related Art

In an office environment, a plurality of users inputs (transmits) a print job from their host computers to a printer using a printer driver, and the printer executes printing of the input print jobs. If a predetermined interruption of printing (an interruption factor), such as a sheet jam or toner shortage occurs, the printer installed in the office environment does not execute printing of the received print jobs and waits until the interruption factor is eliminated. If the interruption factor is eliminated, the printer execute printing.

Japanese Patent Application Laid-Open No. 2017-87591 discusses a printing apparatus that automatically cancels printing of print jobs received before a lapse of a designated time in a case in which the designated time passes while an interruption factor is not eliminated and remains.

In a case in which the printing apparatus discussed in Japanese Patent Application Laid-Open No. 2017-87591 receives a new print job after a print job is automatically cancelled due to a lapse of the designated time, the printing apparatus automatically cancels the new print job after a lapse of another designated time unless the interruption factor is eliminated. If the interruption factor is eliminated before a lapse of another designated time, the printing apparatus automatically executes printing of the new print job.

SUMMARY

According to an aspect of the present disclosure, a printing apparatus includes a reception unit configured to receive a print job, and an execution unit configured to execute printing the print job received by the reception unit, wherein the execution unit is configured to execute cancellation for automatically cancelling printing of the print job received by the reception unit based on a state in which a predetermined interruption of printing the print job remains unsolved continues for a predetermined time or longer; and a notification unit configured to notify at least a user or an external apparatus communicating with the printing apparatus of information indicating that the printing apparatus is currently in a state in which a print job to be newly received by the reception unit is automatically cancelled by the cancellation.

Further features of the present disclosure will become apparent from the following description of exemplary embodiments with reference to the attached drawings.

DESCRIPTION OF THE EMBODIMENTS

An exemplary embodiment will be described in detail below with reference to the drawings. It should be noted that the below-described exemplary embodiment is not intended to limit the scope of the claimed disclosure and that not every combination of features described in the exemplary embodiment is always essential to a technical solution of the disclosure.

Figure 1:
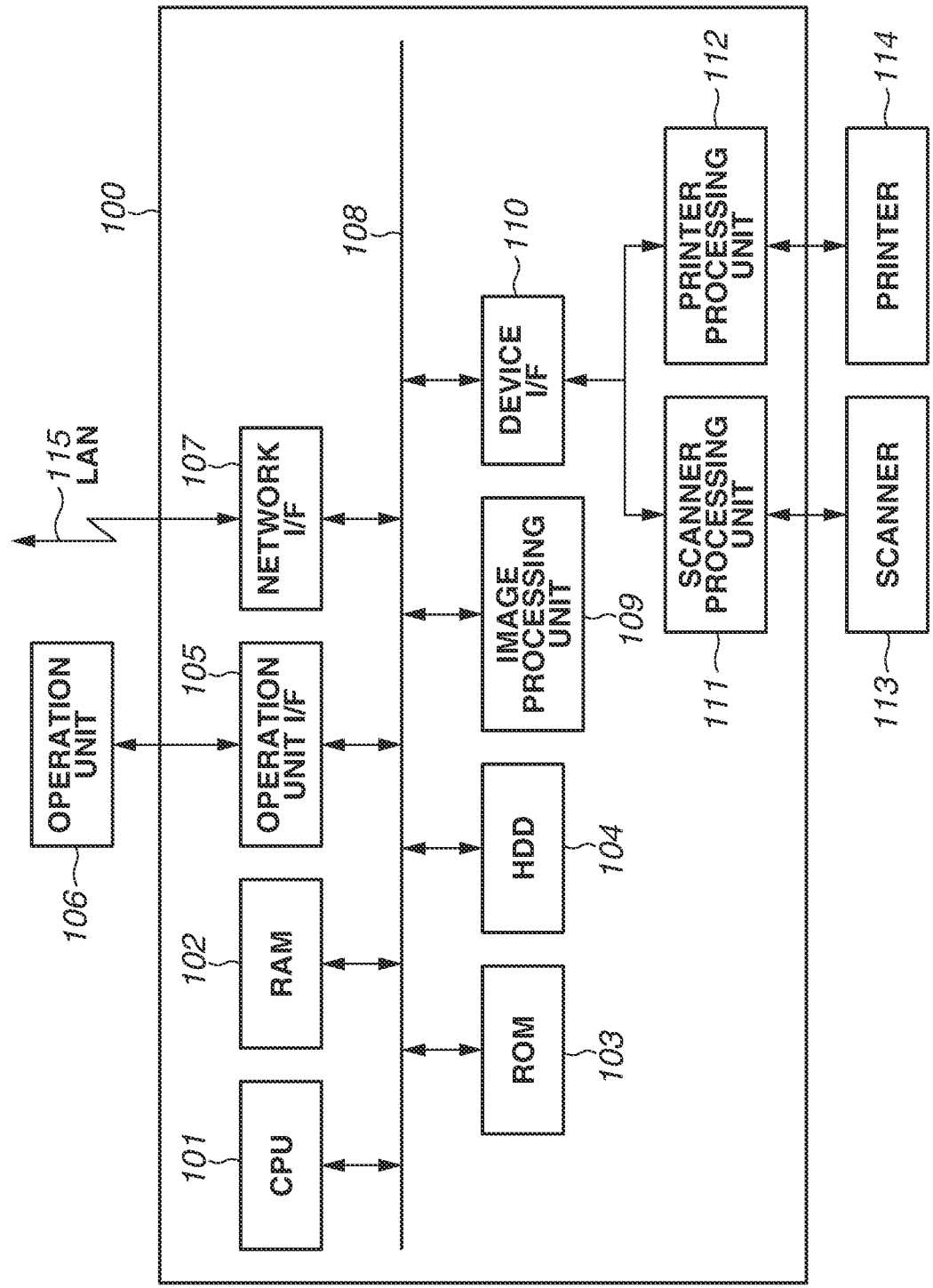
FIG. 1 is a block diagram illustrating a configuration of an image forming apparatus.

FIG. 1 is a block diagram illustrating a configuration of an image forming apparatus 1. According to a first exemplary embodiment, as illustrated in FIG. 1, the image forming apparatus 1 is a printing apparatus in which a plurality of functions, such as a scan function and print function, is combined. The image forming apparatus 1 includes a controller unit 100, a scanner 113, a printer 114, and an operation unit 106. The controller unit 100 controls the entire image forming apparatus 1. The scanner 113 is an image input device which optically reads an image on a document placed on the image forming apparatus 1. The printer 114 is an image output device which prints an image on a recording medium, such as a printing sheet, based on image data.

The operation unit 106 includes hardware keys such as numeric keys and a touch sensor for receiving a user-input instruction such as an instruction to execute a job. The operation unit 106 further includes a display panel configured to display, to a user, apparatus information and job progress information or a screen for setting a function executable by the image forming apparatus 1. The operation unit 106 according to the present exemplary embodiment is a user interface including a touch screen, and the touch screen displays (notifies), to the user, state information about the image forming apparatus 1 and setting screen information and receives an operation performed on the displayed screen.

The scanner 113 and the printer 114 is connected to a scanner processing unit 111 and a printer processing unit 112 of the controller unit 100, respectively. The operation unit 106 is connected to an operation unit interface (I/F) 105 of the controller unit 100. In this configuration, the scanner 113, the printer 114, and the operation unit 106 operate under the control by the controller unit 100.

The controller unit 100 includes a central processing unit (CPU) 101 configured to comprehensively control each block of the controller unit 100. The CPU 101 is connected to a random access memory (RAM) 102, a read-only memory (ROM) 103, a hardware disk drive (HDD) 104, the operation unit I/F 105, and a network I/F 107 via a system bus 108. The network I/F 107 or a Universal Serial Bus I/F is an example of a reception unit. The network I/F 107 or a Universal Serial Bus I/F is an example of a notification unit. The operation unit I/F 105 and/or the network I/F 107 are/is one of the examples of an obtaining unit. The RAM 102 is a general-purpose RAM and is a memory for providing a work area of the CPU 101. The CPU 101 or a plurality of CPUs is an example of an execution unit. Further, the RAM 102 is used as a memory for temporarily storing a parameter and a setting value and as an image memory for storing image data and pages in predetermined units. Further, the RAM 102 stores image data (information) read by the scanner 113 as a print job to be printed by the printer 114, and stores image data (information) received by the network IF 107 as a print job to be printed by the printer 114. According to the present exemplary embodiment, the deletion of a print job from the RAM 102 will be referred to as "cancellation of a print job" or "cancellation of printing a print job". The ROM 103 is a general-purpose ROM and, for example, stores a system boot program as a boot ROM. The HDD 104 stores a system software program, history data, image data, and table. For example, the CPU 101 reads a program stored in the ROM 103 onto the RAM 102 and executes the program to thereby realize a function of the image forming apparatus 1.

The operation unit I/F 105 is an interface for inputting and outputting information between the operation unit 106 and the controller unit 100. The operation unit I/F 105 outputs display data to the operation unit 106 according to an instruction from the CPU 101 and transmits information input on the operation unit 106 by the user to the CPU 101.

The network I/F 107 is connected to a local area network (LAN) 115, which is a wired or wireless medium, and enables input and output of information between the image forming apparatus 1 and a device on the LAN 115. The network I/F 107 has a configuration corresponding to the LAN 115 and may have, for example, a configuration corresponding to near-field wireless communication with a wireless distance of several tens of centimeters. In this case, the network I/F 107 communicates with a wireless mobile terminal.

An image processing unit 109 is a hardware module configured to execute general-purpose image processing and execute, for example, processing such as enlargement/reduction, rotation, and conversion on image data acquired from an external device via the LAN 115. Further, the image processing unit 109 executes processing to develop a page description language (PDL) code received via the LAN 115 into a bitmap image. Further, the image processing unit 109 executes processing to convert compressed/encoded image data stored in the HDD 104 into a format supported by the printer processing unit 112 in a case in which image data is output using the printer 114 via the printer processing unit 112. A device I/F 110 is connected to the scanner 113 and the printer 114 via the scanner processing unit 111 and the printer processing unit 112 and synchronously or asynchronously converts image data and transmits a setting value and an adjustment value. Further, the device I/F 110 transmits state information about the scanner 113 and the printer 114 to the CPU 101. The state information has error information such as information about a jam (sheet jam) that occurs at the scanner 113 or the printer 114 or information indicating that a toner (developing agent) used in printing by the printer 114 becomes empty.

The scanner processing unit 111 is a hardware module configured to perform various types of processing corresponding to a scan function, such as correction, processing, image region separation, scaling, and binarization, on read data (image data) read and input by the scanner 113. The scanner 113 includes an automatic continuous document feeding apparatus (not illustrated) and a reading-through-platen apparatus (not illustrated) and is capable of reading a document placed on a document glass platen and executing two-sided reading of a plurality of documents. Further, the scanner 113 is provided with a sensor for opening and closing a document cover (not illustrated), and a sensor for detecting the presence/absence of a document, and a sensor for detecting the document size. Detection signals of the sensors and the state information about the scanner 113 are transmitted to the CPU 101 via the scanner processing unit 111 and the device I/F 110 so that the CPU 101 recognizes the state of the scanner 113 such as a state in which an error occurs or a state in which an error is solved.

The printer processing unit 112 is a hardware module configured to perform processing corresponding to a print function, such as output correction, resolution conversion, and image printing position adjustment appropriate to the output characteristics of the printer 114, on image data to be printed and output. The printer 114 includes at least one sheet feeding cassette for storing printing sheets. The printer 114 is provided with sensors for detecting the amount of sheets remaining in each sheet feeding cassette, the presence/absence of the toner, and a sheet jam on a sheet conveyance path. Detection signals from the sensors and the state information about the printer 114 are transmitted to the CPU 101 via the printer processing unit 112 and the device I/F 110, and the CPU 101 recognizes the state of the printer 114, such as a state in which an error occurs or a state in which an error is solved. Specifically, the CPU 101 detects a state of occurrence and elimination of a predetermined interruption factor in printing a print job (e.g., sheet shortage, toner shortage, sheet jam) based on the information from the sensors, and controls whether to execute printing based on the detection. Hereinafter, a predetermined interruption factor in printing a print job will be referred to as an error. According to the present exemplary embodiment, a sheet shortage error is an error associated with a print job and is solved by cancelling the print job having caused the sheet shortage or by loading paper. Further, a toner shortage error is an error associated with the image forming apparatus 1 and is solved by supplying the toner but is not solved by cancelling the print job having caused the toner shortage. A sheet jam error is an error associated with the image forming apparatus 1 and is solved by solving the sheet jam but is not solved by cancelling the print job having caused the sheet jam.

Figure 2:
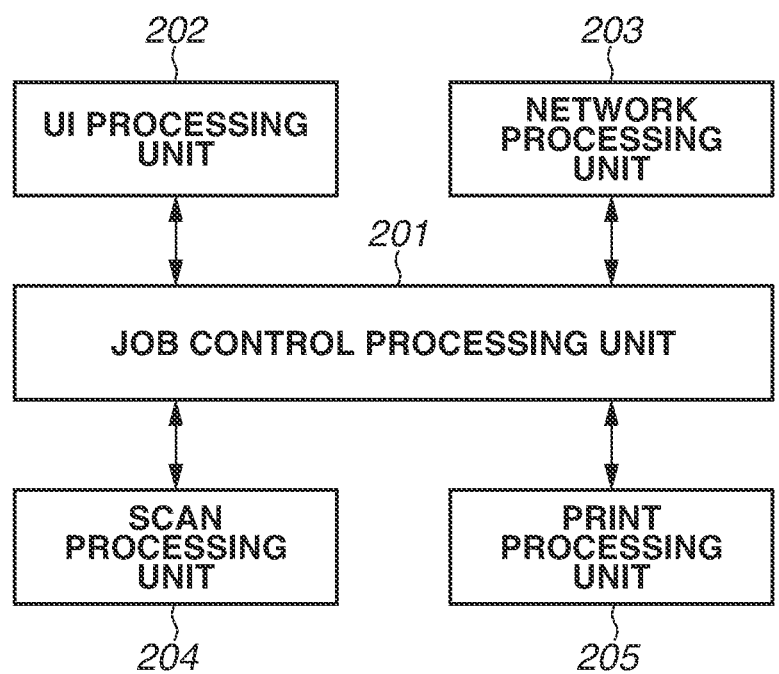
FIG. 2 is a diagram illustrating a software module configuration of the image forming apparatus.

FIG. 2 is a diagram illustrating a software module configuration of the image forming apparatus 1. The CPU 101 executes a program to realize each module illustrated in FIG. 2. A job control processing unit 201 controls the other modules and comprehensively controls execution of each job that occurs in the image forming apparatus 1, such as copy, print, scan, and user interface (UI) processing.

A UI processing unit 202 performs processing associated with the operation unit 106 or the operation unit I/F 105. The UI processing unit 202 transmits information about an operation performed on the operation unit 106 by the user to the job control processing unit 201 and displays a display screen on the operation unit 106 according to an instruction from the job control processing unit 201. The UI processing unit 202 receives, from the user, a copy instruction to read image data using the scanner 113 and print the read image data using the printer 114, and transmits the received copy instruction to the job control processing unit 201. Further, the UI processing unit 202 edits drawing data to be displayed on the operation unit 106.

A network processing unit 203 communicates with a device (e.g., host computer) on the LAN 115 via the network I/F 107. If the network processing unit 203 receives a control command or data (e.g., print data or image data described in a PDL) from the device on the LAN 115, the network processing unit 203 transmits the received information to the job control processing unit 201. Specifically, the network processing unit 203 receives image data (information) and a print instruction to print the image data using the printer 114 from an external apparatus on the LAN 115 and transmits the instruction and the image data to the job control processing unit 201. Further, the network processing unit 203 transmits a control command and data to the device on the LAN 115 according to an instruction from the job control processing unit 201.

A scan processing unit 204 controls the scanner 113 and the scanner processing unit 111 according to an instruction from the job control processing unit 201 and executes processing to read a document placed on the scanner 113. The scan processing unit 204 controls the scanner processing unit 111 to execute image processing on the read image data. Further, the scan processing unit 204 acquires the state information (e.g., error information indicating the presence/absence of an error) about the scanner processing unit 111 and the scanner 113 and transmits the acquired state information to the job control processing unit 201.

A print processing unit 205 controls the image processing unit 109, the printer processing unit 112, and the printer 114 to execute a print job according to an instruction from the job control processing unit 201. The print processing unit 205 receives image data to be printed and information, such as image information (image data size, color mode, resolution) and output sheet information (size, printing direction), from the job control processing unit 201. Then, the print processing unit 205 controls the image processing unit 109 and the printer processing unit 112 to execute appropriate image processing on the image data, and controls the printer processing unit 112 and the printer 114 to print the image data on a printing sheet (sheet). Further, the print processing unit 205 acquires the state information (e.g., error information indicating the presence/absence of an error such as a sheet shortage, toner shortage, or sheet jam) about the printer processing unit 112 and the printer 114 and transmits the acquired state information to the job control processing unit 201.

The job control processing unit 201 receives the information transmitted from the UI processing unit 202 or the network processing unit 203 as a print job and registers the print job in a job list managed on the RAM 102. Specifically, if the job control processing unit 201 receives print data from an external apparatus via the network I/F 107 or a copy instruction from the user via the operation unit 106 and the operation unit I/F 105, the job control processing unit 201 receives the print job. Then, the job control processing unit 201 stores the print job in the RAM 102. Further, as described below, the job control processing unit 201 cancels a print job by deleting the print job from the RAM 102. Instead of deleting the print job from the RAM 102, the job control processing unit 201 can change the state of the print job to a printing standby state on the job list so that printing is not automatically executed even if the factor of the interruption is eliminated. The job control processing unit 201 further issues an instruction for processing the job to the modules. The job control processing unit 201 further defines an automatic cancellation state including at least two states, an execution state and a non-execution state, as a state relating to an automatic job cancellation function of the image forming apparatus 1, and stores the current automatic cancellation state in the RAM 102. The execution state refers to a state in which a print job received by the image forming apparatus 1 after a lapse of a designated time while an error remains unsolved is automatically cancelled before a lapse of another designated time, as described below. The non-execution state refers to a state in which the print job is not automatically cancelled and is suspended in the image forming apparatus 1. In the non-execution state, the print job is to be cancelled according to a cancel instruction from the user. The job control processing unit 201 causes the UI processing unit 202 to display a screen corresponding to the current automatic cancellation state on the operation unit 106.

Figure 3:
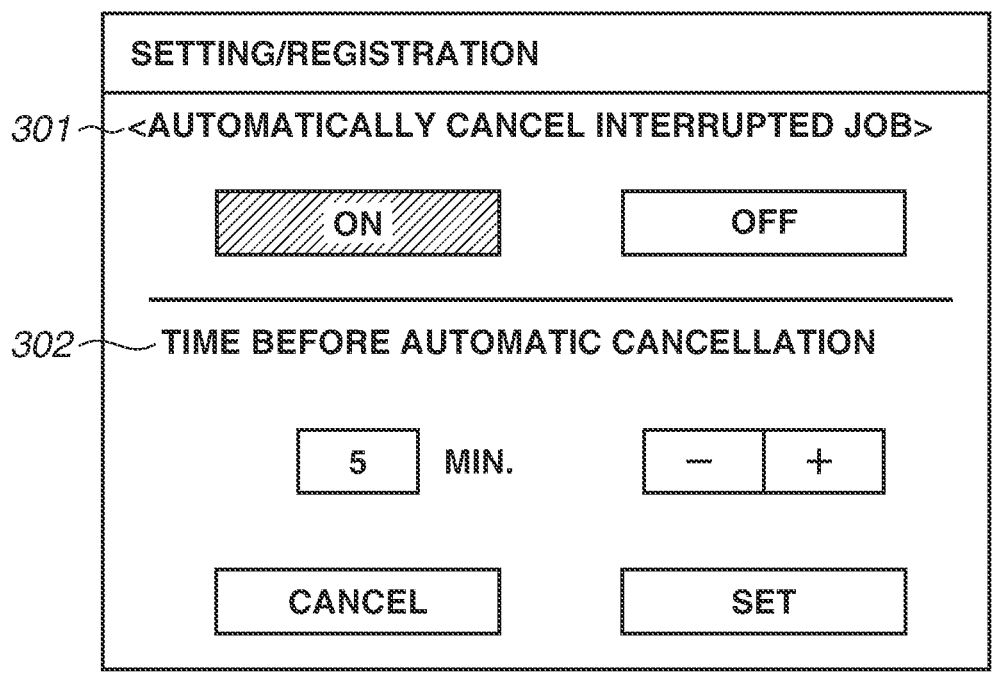
FIG. 3 is a diagram illustrating a print job automatic cancellation setting screen.

FIG. 3 is a diagram illustrating a setting screen for automatic cancellation of a job at the time of an interruption of printing due to an occurrence of an error according to the present exemplary embodiment. A setting item 301 is an item for receiving a setting to enable or disable the function of automatically cancelling an interrupted job when the designated time passes after an error occurs. The term "interrupted job" refers to a print job the printing of which is interrupted due to an error. In a case in which the setting item 301 is set to "ON" by the user, the interrupted job is cancelled when a predetermined time passes after the error occurs. In a case in which the setting item 301 is set to "OFF" by the user, the interrupted job is not cancelled. To automatically cancel a job is to cancel the job even if no cancel instruction is issued from the user after the job is received.

A setting item 302 is an item for receiving user-designation of time at which an interrupted job is automatically cancelled, and for setting the time thus designated as the designated time. The setting item 302 is in a settable state in the case in which the setting item 301 is set to "ON", whereas the setting item 302 is in a grayed-out state so that the setting item 302 is not settable in the case in which the setting item 301 is set to "OFF". The designated time is settable in the range of zero minutes to 999 minutes by the minute. In FIG. 3, the user can adjust the designated time from "five minutes" displayed as a default value using a plus button and a minus button. In a case in which a SET button is pressed by the user, the setting received via the setting screen in FIG. 3 is set, and the job control processing unit 201 and the UI processing unit 202 store the set setting in the HDD 104 or the RAM 102. In a case in which a CANCEL button is pressed by the user, the setting received via the setting screen in FIG. 3 is cancelled. In a case in which the user designates zero minutes as the time to be counted before automatic cancellation, every print job registered in the job list at the time point of an occurrence of an error is immediately cancelled at the time point of the occurrence of the error according to the present exemplary embodiment. In a case in which a value other than zero minutes is designated, a print job registered in the job list is not cancelled during the designated time from the time point of the occurrence of the error. However, if the designated time or longer passes while the error remains unsolved, every print job registered in the job list at that time point is cancelled according to the present exemplary embodiment. In this case, as described below, a print job received in the state in which the designated time or longer passes while the error remains unsolved (state in which the error continues for the designated time or longer) is immediately cancelled. More specifically, a new print job registered in the job list is cancelled before a lapse of the designated time counted from the time point of the registration of the new print job. According to the present exemplary embodiment, a user having administrator rights of the image forming apparatus 1 is the only user allowed to set the setting items 301 and 302. Thus, the image forming apparatus 1 has a function of authenticating the administrator, and the user inputs an identifier (ID) and a password of the administrator to the operation unit 106, and if the 1D and the password are correct, the image forming apparatus 1 authenticates the user as the user having the administrator rights.

Figure 4:
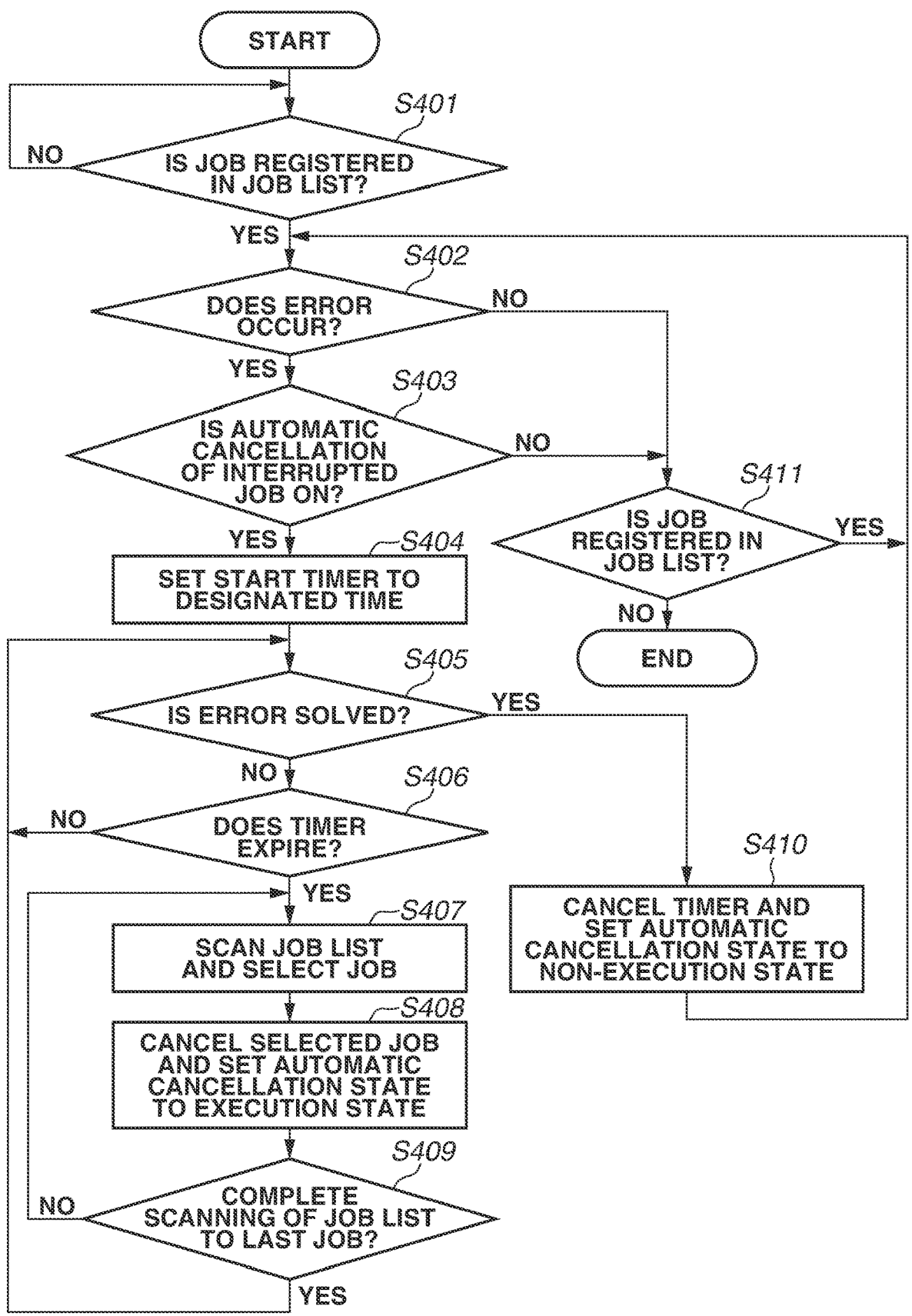
FIG. 4 is a flowchart illustrating an execution control process for automatic cancellation of a print job.

FIG. 4 is a flowchart illustrating a controlling execution process for job cancellation. According to the present exemplary embodiment, an automatic cancellation function is executed for every job for which printing is not completed due to an error and that is registered in the job list at the time point after a lapse of the time designated via the setting item 302. This function corresponds to YES in step S406 to step S408. Further, an automatic cancellation function is executed for a new print job received in the state in which the designated time or longer passes while the error remains unsolved, before a lapse of another designated time counted from the time point at which the new print job is received. This function corresponds to YES in step S409, NO in step S405, and YES in step S406 to step S408 described below.

For example, the CPU 101 reads a program stored in the HDD 104 onto the RAM 102 and executes the read program to realize the process illustrated in the flowchart. Processing procedure of the flowchart is started if the job control processing unit 201 registers a job in the job list. Hereinafter, the term "job" refers to a print job. The job received by the image forming apparatus 1 is registered in the job list simultaneously with the process illustrated in the flowchart.

In step S401, the job control processing unit 201 checks whether a job is registered in the job list. If a job is registered (YES in step S401), the processing proceeds to step S402. If no job is registered in the job list (NO in step S401), the processing returns to step S401.

In step S402, the job control processing unit 201 determines whether an error occurs. The job control processing unit 201 receives error information from the scan processing unit 204 or the print processing unit 205. Then, if the error information indicates that a predetermined interruption factor interrupting execution (continuation) of printing occurs, the job control processing unit 201 determines that an error occurs. Based on the occurrence of the error, the job control processing unit 201 starts measuring the time using a timer described below.

Examples of an error caused by the printer 114 (a predetermined interruption factor interrupting printing, an interruption factor) include a sheet shortage in a case in which there is no more sheet in the sheet feeding cassette, a sheet mismatch in a case in which the designated sheet is not in the sheet cassette, a sheet jam on the sheet conveyance path, and a toner shortage. If the print processing unit 205 notifies the job control processing unit 201 of the error information, the job control processing unit 201 registers information indicating that the target job is an interrupted job in the job list. Then, the job control processing unit 201 instructs the scan processing unit 204 and the print processing unit 205 to stop printing the job.

Examples of an error caused by the scanner 113 include a sheet jam in an automatic continuous document feeding apparatus (not illustrated). If the scan processing unit 204 notifies the job control processing unit 201 of the error information, the job control processing unit 201 registers information indicating that the target job is an interrupted job in the job list. Then, the job control processing unit 201 instructs the scan processing unit 204 and the print processing unit 205 to stop printing the job.

In step S402, if the job control processing unit 201 determines that an error occurs (YES in step S402), the job control processing unit 201 causes the UI processing unit 202 to display a screen (error screen) indicating that the error occurs on the operation unit 106, and the processing proceeds to step S403. If the job control processing unit 201 determines that no error occurs (NO in step S402), the processing proceeds to step S411.

In step S403, the job control processing unit 201 determines whether the setting item 301 in FIG. 3 is "ON". If the job control processing unit 201 determines that the setting item 301 is "ON" (YES in step S403), the processing proceeds to step S404. On the other hand, if the job control processing unit 201 determines that the setting item 301 is not "ON" (NO in step S403), the processing proceeds to step S411.

In step S404, the job control processing unit 201 sets the timer to the time to be counted before automatic cancellation (the time is also referred to as "hold time", "designated time", or "timer set time") that is received via the setting item 302 in FIG. 3, and starts the timer. The timer according to the present exemplary embodiment is a count-down timer, so that if the timer is started, the job control processing unit 201 counts down the set designated time. The count-down timer counts down the time by the predetermined time unit (e.g., one minute). For example, if the designated time is set to "five minutes", the job control processing unit 201 counts down the count-down timer by "one" from "five (minutes)" every time one minutes passes.

In step S405, the job control processing unit 201 determines whether the error is solved (whether the interruption factor is solved). Specifically, the job control processing unit 201 receives the error information from the scan processing unit 204 or the print processing unit 205. If the error information indicates that a specific error does not occur, the job control processing unit 201 determines that the error is solved. If the job control processing unit 201 determines that the error is solved (YES in step S405), the processing proceeds to step S410. On the other hand, if the job control processing unit 201 determines that the error is not solved (NO in step S405), the processing proceeds to step S406.

In step S406, the job control processing unit 201 determines whether the timer set time set in step S404 expires. Specifically, the job control processing unit 201 determines whether the designated time or longer passes while the error remains unsolved. According to the present exemplary embodiment, if the count-down timer is zero, the job control processing unit 201 determines that the timer set time expires. If the job control processing unit 201 determines that the timer set time expires (YES in step S406), the processing proceeds to step S407 to execute automatic cancellation of the job. If the job control processing unit 201 determines that the timer set time does not expire (NO in step S406), the processing returns step S405. Since the count-down timer remains zero even after the timer set time expires, the processing proceeds to step S407 also in the case in which whether the timer set time expires is determined again in step S406. The job control processing unit 201 can change (set) the automatic cancellation state of the image forming apparatus 1 from the non-execution state to the execution state when the count-down timer becomes zero. In this case, in step S406, the job control processing unit 201 can determine whether the current automatic cancellation state of the image forming apparatus 1 is the execution state, and the processing can proceed to step S407 if the job control processing unit 201 determines that the current automatic cancellation state of the image forming apparatus 1 is the execution state.

Next, in the processing loop of steps S407 to S409, printing of every registered print job remained in the job list at expiration of the timer set time is cancelled. Details of the processing will be described below.

In step S407, if the job control processing unit 201 detects the expiration of the time counted before automatic cancellation (expiration of the timer set time), the job control processing unit 201 acquires a list (job list) of jobs received before the current time point (i.e., before the expiration of the timer). Then, the job control processing unit 201 selects the first job in the job list.

In step S408, the job control processing unit 201 cancels the job selected in step S407. More specifically, printing of the selected print job is cancelled. In a specific example, the job control processing unit 201 deletes information about the selected print job from the job list (i.e., the RAM 102) so that printing of the selected print job will not be executed. In this process, the job control processing unit 201 also deletes print data of the print job. In this way, the print job is not printed automatically even if the interruption factor is eliminated after expiration of the timer set time. In step S408, the job control processing unit 201 can record the information (message or identification number) indicating that the job is cancelled because the error remains unsolved for the predetermined time, as history information about the print job cancelled in step S408. The user can refer to the information later.

Figure 10:
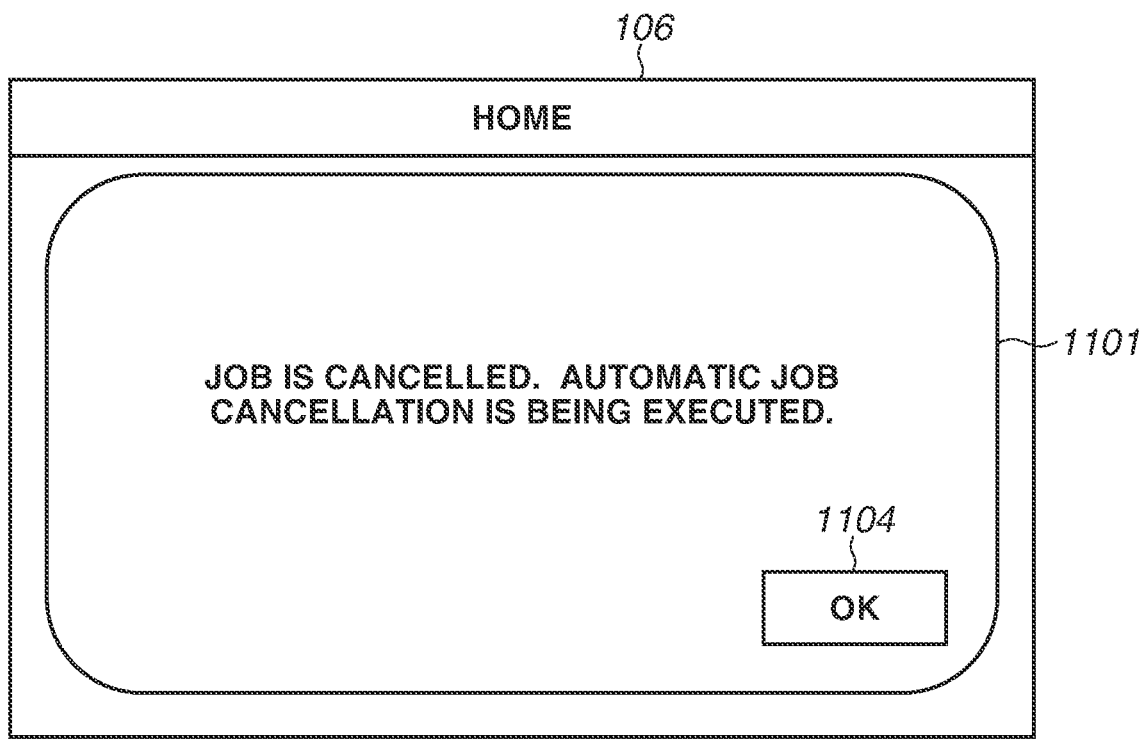
FIG. 10 is a diagram illustrating an example of a screen which is displayed on the operation unit in a case in which a print job is cancelled by a print job automatic cancellation function.

If printing of the print job is cancelled in step S408, the job control processing unit 201 causes the UI processing unit 202 to display the screen illustrated as an example in FIG. 10 on the operation unit 106. A display screen 1101 illustrated as an example in FIG. 10 has, for example, information indicating that the print job is cancelled. Further, for example, the display screen 1101 has information indicating that "the image forming apparatus 1 is in the state of executing automatic cancellation of printing a new received print job". Further, the display screen 1101 includes an OK button 1104, and if the OK button 1104 is pressed by the user, the UI processing unit 202 displays a screen that is displayed immediately before the display screen 1101 is displayed.

Further, in step S408, the job control processing unit 201 sets the automatic cancellation state stored in the RAM 102 to the execution state. If the automatic cancellation state is set to the "execution state", the UI processing unit 202 displays information as illustrated as an example in FIG. 8 or 9 on the operation unit 106. Specifically, the operation unit 106 notifies the user that "the image forming apparatus 1 is in the state of executing automatic cancellation of printing a new received print job". Details of the process will be described below with reference to FIG. 5.

Alternatively, the below-described processing can be performed in place of the cancellation processing in step S408. Specifically, the job control processing unit 201 does not delete the print job selected in step S407 from the RAM 102 (i.e., the job control processing unit 201 does not cancel the print job) and, instead, changes a state of the print job to a waiting state for a print instruction. In this way, the print job is changed to the state of waiting for a print instruction from the user, so that even if the interruption factor is eliminated after a lapse of the timer set time, the print job is not printed automatically. After the interruption factor is eliminated, the user gives a print instruction to print the print job via a printing-unfinished job list (not illustrated), whereby the print job in the state of waiting for a print instruction is printed.

In step S409, the job control processing unit 201 determines whether the job list is scanned to the last job in the job list, i.e., to the newest job in the job list. If the job control processing unit 201 determines that the job list is not scanned to the last job in the job list (NO in step S409), then the job control processing unit 201 selects the next job in the job list in step S407 and executes cancellation in step S408. On the other hand, in step S409, if the job control processing unit 201 determines that the job list is scanned to the last job in the job list (YES in step S409), the processing returns to step S405.

The processing returns to step S405 from step S409 and this is one of a feature of the present exemplary embodiment. More specifically, since the processing returns to step S405 from step S409 without cancelling the timer, the timer set time remains expired if the error still remains unsolved, so that steps S407 to S409 are executed after the determination in steps S405 and S406. Thus, a new print job that is received and registered in the job list after expiration of the timer set time and before the error is solved is promptly cancelled without waiting for another lapse of timer set time. In place of the cancellation processing, the processing to change the state of the print job to the waiting state for a print instruction can be executed. The print job in waiting state for a print instruction is not printed and is suspended in the image forming apparatus 1 until the image forming apparatus 1 receives a print instruction from the user.

In step S405, if the job control processing unit 201 determines that the error is solved (YES in step S405), then in step S410, the job control processing unit 201 cancels the timer set in step S404. The job control processing unit 201 causes the UI processing unit 202 to turn off the error screen displayed on the operation unit 106 and returns to a normal screen (standby screen). Alternatively, a screen indicating that the error is solved is displayed on the operation unit 106 only for a predetermined time after the error screen is turned off, and thereafter the normal screen (standby screen) is displayed. Then, the job control processing unit 201 causes the scan processing unit 204 and the print processing unit 205 to automatically resume printing processing to print the interrupted print job. The printing is resumed without an additional print instruction from the user after an error solving operation. As described above, if an interruption factor (error) is eliminated before a lapse of the hold time (designated time) after occurrence of the interruption factor, printing of the interrupted print job and subsequent print jobs is automatically resumed. After step S410, the processing returns to step S402.

Further, in step S410, the job control processing unit 201 sets the automatic cancellation state stored in the RAM 102 to the non-execution state. If the automatic cancellation state is set to the "non-execution state", the operation unit 106 stops displaying the information illustrated as an example in FIG. 8. Specifically, the operation unit 106 stops displaying the information that notifies the user that "the image forming apparatus 1 is in the state of executing automatic cancellation of printing a new received print job". Details of the process will be described below with reference to FIG. 6.

In the case in which the job control processing unit 201 determines that no error occurs in step S402 or that the setting item 301 is not "ON" in step S403, the job control processing unit 201 determines, in step S41.1, whether a job is registered in the job list. If the job control processing unit 201 determines that a job is registered in the job list (YES in step S411), the processing returns to step S402. If the job control processing unit 201 determines that no job is registered in the job list (NO in step S411), the process is then ended. The time when the process is ended is when printing of the job is completed. After the process is ended, if a new job is received and registered in the job list, the process is started again.

While, according to the present exemplary embodiment, the count-down timer is used, the measurement unit is not limited to the count-down timer, and any unit capable of measuring the time (i.e., the time that passes while the error remains unsolved) during which an error occurs and continues can be used. For example, in step S404, the job control processing unit 201 can start the count-up timer from zero, and in step S406, the job control processing unit 201 can determine whether the count-up timer reaches the designated time.

Further, for example, in step S404, the job control processing unit 201 acquires the current time from a real-time clock (RTC) and stores the acquired current time, and in step S406, the job control processing unit 201 acquires the current time from the RTC. Then, the job control processing unit 201 can determine whether the difference time between the acquired time and the time stored in step S404 reaches the designated time.

Figure 5:
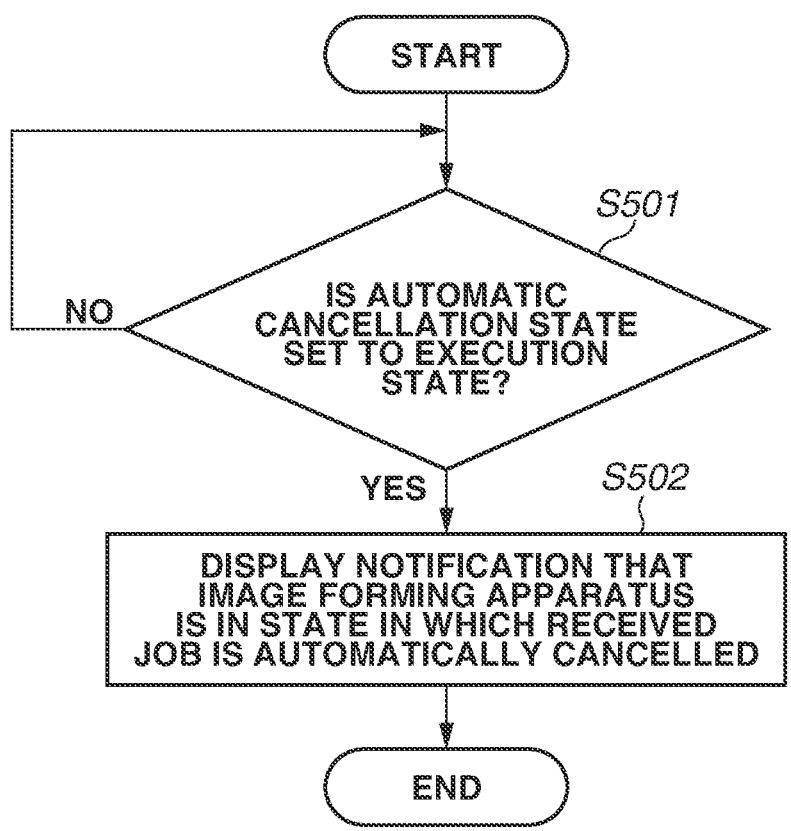
FIG. 5 is a flowchart illustrating a process for setting an automatic cancellation state to an execution state.

FIG. 5 is a flowchart illustrating a process of displaying, on the operation unit 106, information that notifies the user that the image forming apparatus 1 is in the state of executing automatic job cancellation based on the automatic cancellation state. The process is executed by the UI processing unit 202.

In step S501, the UI processing unit 202 refers to the automatic cancellation state stored in the RAM 102 and determines whether the automatic cancellation state is set to the "execution state". If the automatic cancellation state is set to the "execution state" (YES in step S501), the processing proceeds to step S502. On the other hand, if the automatic cancellation state is not set to the "execution state" (NO in step S501), step S501 is re-executed after a predetermined time (e.g., after 100 milliseconds).

In step S502, the UI processing unit 202 displays, on the operation unit 106, information that notifies the user that the image forming apparatus 1 is in the state in which automatic cancellation of printing a new received print job is executed. Examples of the information includes information (message "automatic job cancellation is being executed.") displayed in a status display section 904 in FIG. 8. The information displayed in the status display section 904 in FIG. 8 indicates that the image forming apparatus 1 is in the state in which automatic cancellation of printing a new received print job is executed because the timer set time expires while the error remains unsolved (YES in step S406).

Figure 9:
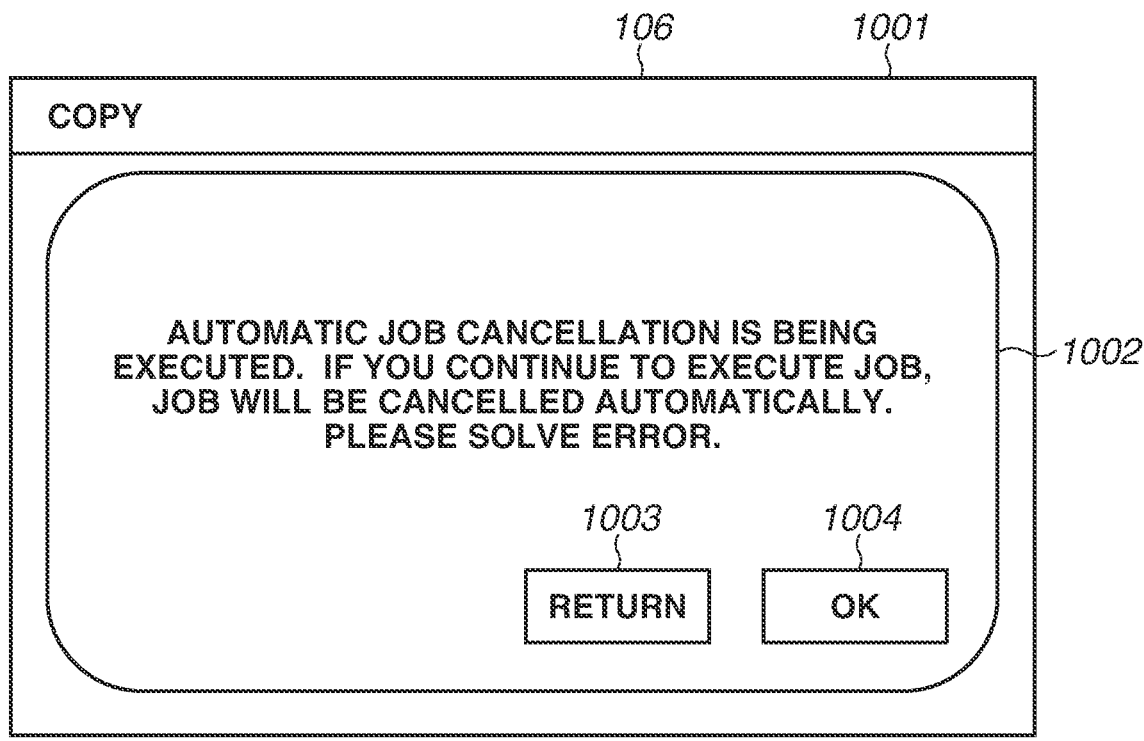
FIG. 9 is a diagram illustrating an example of a warning screen displayed on the operation unit.

Further, the information is, for example, information displayed in a warning pop-up display 1002 illustrated in FIG. 9. The information displayed in the warning pop-up display 1002 is displayed in a case in which the user instructs the image forming apparatus 1 to execute copying, and indicates that the copy print job will be cancelled automatically unless the error is solved.

The displaying in step S502 can be performed at the time when the operation unit 106 displays a specific screen such as the main menu screen or copy setting screen on the operation unit 106.

Figure 6:
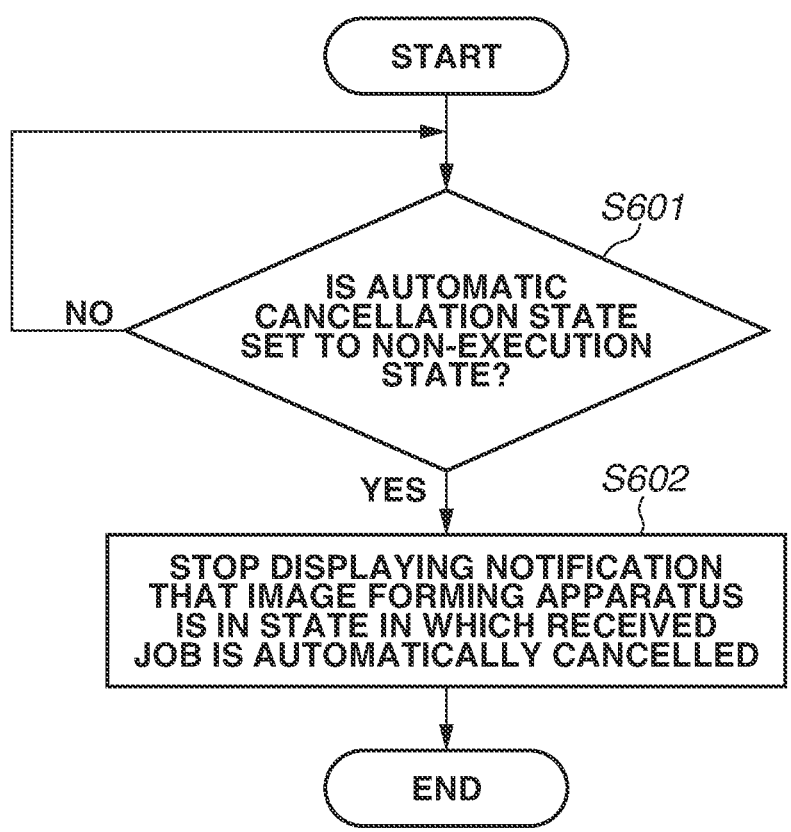
FIG. 6 is a flowchart illustrating a process for setting the automatic cancellation state to a non-execution state.

FIG. 6 is a flowchart illustrating a process of stopping displaying, on the operation unit 106, the information that notifies the user that the image forming apparatus 1 is in the state of executing automatic job cancellation based on the automatic cancellation state. The process is executed by the UI processing unit 202.

In step S601, the UI processing unit 202 refers to the automatic cancellation state stored in the RAM 102 and determines whether the automatic cancellation state is set to the "non-execution state". If the automatic cancellation state is set to the "non-execution state" (YES in step S601), the processing proceeds to step S602. If the automatic cancellation state is not set to the "non-execution state" (NO in step S601), step S601 is re-executed after a predetermined time (e.g., after 100 milliseconds).

In step S602, the UI processing unit 202 stops displaying the information on the operation unit 106, which is displayed in step S502. As a result of stopping the display, the main menu screen is changed to, for example, the screen illustrated in FIG. 7, and the copy setting screen is changed to the state in which the information displayed in the status display section 904 illustrated in FIG. 8 is not displayed.

Figure 7:
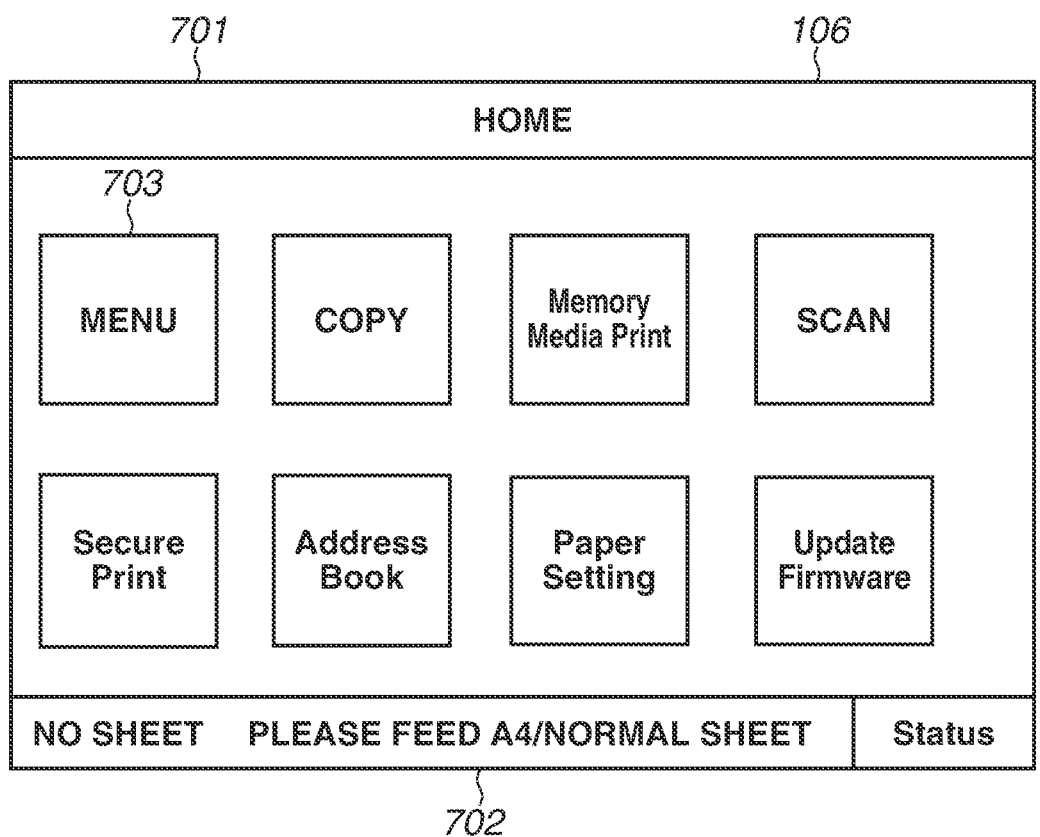
FIG. 7 is a diagram illustrating an example of a main menu screen displayed on an operation unit.

FIG. 7 illustrates an example of a main menu screen 701 of a UI display screen displayed on the operation unit 106 by the UI processing unit 202. The main menu screen 701 is a screen that is displayed on the operation unit 106 immediately after the image forming apparatus 1 is activated, and the user selects various functions via the main menu screen 701.

Display of operation icons 703 are set suitable with the purpose of user operation. In FIG. 7, eight operation icons 703 are displayed, including a "MENU" icon for setting a menu setting, a "COPY" icon for executing copying, and a "Secure Print" icon for setting a password and executing printing. The content displayed in a status display section 702 is changeable by the UI processing unit 202 based on the set automatic cancellation state. For example, in a case in which an error occurs and the automatic cancellation state is set to the "non-execution state", information indicating details of the error is displayed. In the example illustrated in FIG. 7, details of the error are a sheet shortage of A4-size normal sheet. In a case in which no error occurs, neither error details nor information indicating that the image forming apparatus 1 is in the state of executing automatic job cancellation (information indicating that the image forming apparatus 1 is in the state in which automatic cancellation of printing a new received print job) is executed is displayed. In the case in which the automatic cancellation state is set to the "execution state", information indicating error details and information indicating that the image forming apparatus 1 is in the state in which automatic job cancellation is executed are alternately displayed.

Figure 8:
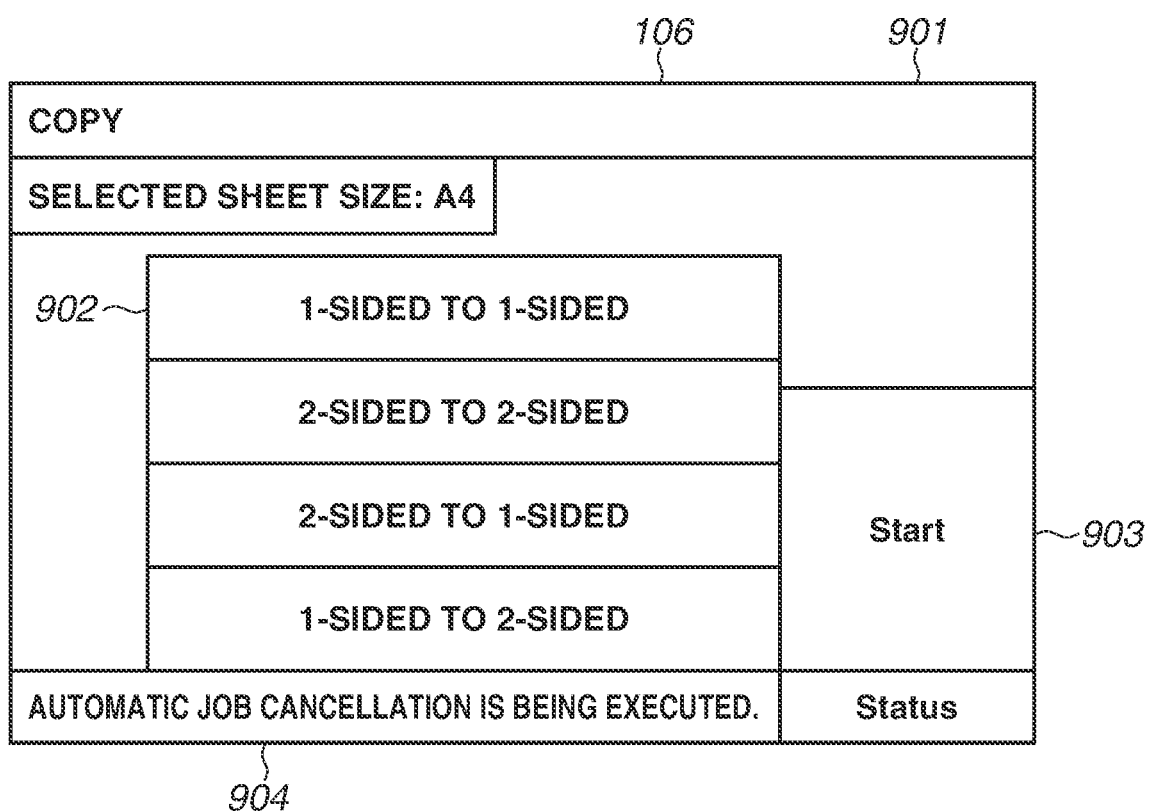
FIG. 8 is a diagram illustrating an example of a copy setting screen which is displayed on the operation unit.

FIG. 8 illustrates an example of the copy setting screen displayed on the operation unit 106 in response to the user pressing the "COPY" icon illustrated in FIG. 7 in the state in which the automatic cancellation state is set to the "execution state" by the job control processing unit 201. This is an example of a display screen in a case in which a copy setting screen 901 illustrated in FIG. 8 as an example is displayed. The status display section 904 displays information corresponding to the current automatic cancellation state. The UI processing unit 202 receives an operation performed on the operation unit 106 by the user and transmits the received information to the job control processing unit 201. For example, the UI processing unit 202 receives the press of a copy setting button 902 by the user. Specifically, the UI processing unit 202 receives, as a copy setting, a setting of reading only one side (front surface) of a document, a setting of reading two sides (front and back surfaces) of a document, a setting of printing a read document image on only one side (front surface) of a sheet, or a setting of printing a read document image on two sides (front and back surfaces) of a sheet. Then, the UI processing unit 202 receives the press of a copy execution button 903 by the user. The receipt of the pressing operation on the copy execution button 903 corresponds to the receipt of an instruction to execute printing a copy (print job). In the case in which no error occurs, the job control processing unit 201 prints a copy (print job) based on the received setting. In the case in which the automatic cancellation state of the image forming apparatus 1 is set to the "execution state", the job control processing unit 201 causes the UI processing unit 202 to display a warning screen 1001 illustrated as an example in FIG. 9.

The warning pop-up display 1002 illustrated as an example in FIG. 9 is displayed if, for example, the copy execution button 903 is pressed by the user in the state in which the automatic cancellation state of the image forming apparatus 1 is set to the "execution state" as illustrated in FIG. 8. This display notifies the user in advance that the copy print job will automatically be cancelled immediately if the user issues a copy execution instruction without solving the error.

The warning pop-up display 1002 contains a RETURN button 1003 and an OK button 1004, both of which can be pressed by the user. If the RETURN button 1003 is pressed, the screen is changed to the previous screen (e.g., FIG. 8) without executing the copy print job. If the OK button 1004 is pressed, the new copy print job is received. In a case in which the error is already solved before the new copy print job is received, the job control processing unit 201 executes the process illustrated in FIG. 4 from step S401 or S411 on the new received print job. The time before the new copy print job is received refers to the time during which the warning screen 1001 illustrated in FIG. 9 is displayed. On the other hand, in a case in which the error still remains unsolved, the job control processing unit 201 executes the process illustrated in FIG. 4 from step S407 on the new received print job. Specifically, the job control processing unit 201 automatically and immediately cancels the new print job. If the new print job is immediately cancelled as described above, the UI processing unit 202 displays a screen illustrated as an example in FIG. 10 on the operation unit 106.

According to the above-described present exemplary embodiment, the user can understand that the image forming apparatus 1 is in the state in which if a new print job received, the new print job is automatically and immediately cancelled. Thus, the user inputs a print job to the image forming apparatus 1 after solving the error so that the situation in which the new print job is cancelled immediately after the new print job is input is avoided.

According to the above-described exemplary embodiment, the operation unit 106 displays the screens illustrated in FIGS. 8, 9, and 10 to notify the user that the image forming apparatus 1 in which an error remains unsolved is currently in the state for executing automatic and immediate cancellation of printing for a new received print job. The present disclosure is not limited to the screen displays. Specifically, an audio notification that the image forming apparatus 1 is currently in the state for executing automatic and immediate cancellation of printing of a new received print job can be provided to the user of the image forming apparatus 1 using a buzzer (not illustrated) of the image forming apparatus 1. Further, a notification of the current state of the image forming apparatus 1 can be provided to the user of the image forming apparatus 1 by turning on a light emitting diode (LED) (not illustrated) of the image forming apparatus 1 or using a blinking pattern of the LED, instead of the screen display.

Further, according to the above-described exemplary embodiment, the operation unit 106 of the image forming apparatus 1 provides a notification of the current state of the image forming apparatus 1 in which an error remains unsolved, to the user in front of the image forming apparatus 1. The present disclosure is not limited to the above-described configuration. Specifically, a notification that the image forming apparatus 1 is currently in the state for executing automatic and immediate cancellation of a new received print job can be provided (transmitted) to an external apparatus capable of transmitting print data to the image forming apparatus 1 via the network I/F 107. The notification is provided to the external apparatus as described above so that the user of the external apparatus can be notified that if print data is transmitted, printing of the print data will immediately and automatically be cancelled. Specifically, according to the present disclosure, the image forming apparatus 1 provides the notification that the image forming apparatus 1 is currently in the state for executing immediate and automatic cancellation of a new received print job to at least the user or the external apparatus communicating with the image forming apparatus 1.

Further, in the above-described exemplary embodiment, after expiration of the timer set time, the screens as illustrated in FIGS. 8 to 10 are displayed to provide a notification that the image forming apparatus 1 in which an error remains unsolved is currently in the state for executing immediate and automatic cancellation of printing of a new received print job. The present disclosure is not limited to the above-described notification timing. Specifically, the notification can be provided after start of the timer set time measurement and before expiration of the timer set time (during the period in which the processing loop of steps S405 and S406 is repeated), such as the time point at which the error occurs.

According to the above-described exemplary embodiment, the UI processing unit 202 displays the copy execution button 903 in an enabled state even in the case in which the automatic cancellation state is set to the "execution state". In a modified example, the UI processing unit 202 can display the copy execution button 903 in a not-enabled state in the case in which the automatic cancellation state is set to "execution state".

According to the above-described exemplary embodiment, if the expiration of the timer set time is detected, cancellation of the first job to the last job in the list of jobs received before the current time point (before expiration of the timer set time) is continuously performed. More specifically, if the timer set time expires, all the print jobs in the list are cancelled. The present disclosure is also applicable to an arrangement in which whether an error is solved is checked after cancellation of one job. Specifically, in the flowchart in FIG. 4, step S409 can be omitted and the processing can proceed from step S408 to step S405. In the flowchart in FIG. 5, step S511 can be omitted and the processing can proceed from step S510 to step S512. Since the print job is cancelled in step S408 as described above, if, for example, a print job causing a sheet shortage is cancelled, the error is solved, and the processing proceeds to step S410 after the determination in step S405. Thus, the next print job is started in a state in which the error is solved and the timer is cancelled, so that if an error occurs in printing the print job, the count-down timer runs again. Then, if the designated time or longer passes while the error remains unsolved, printing of the print job is cancelled.

Further, while every job is included in a cancellation target in the above-described exemplary embodiment, a job can be excluded from the cancellation target based on the type of the job. For example, a job for which it is difficult to identify the transmitter and it is difficult to be re-input, such as a facsimile, can be excluded from the cancellation target. The jobs can be accumulated in a memory, and a job that requires a user operation for printing (hold printing, memory reception of facsimiles) can be excluded from the cancellation target.

Further, according to the above-described exemplary embodiment, when the timer set time expires, a print job received before expiration of the timer set time and a print job received thereafter are cancelled. Instead of cancelling a print job, a print job can be set in such a manner that automatic execution of the print job is not to be executed after elimination of an interruption factor, as described above. For example, a print job can be held in the printing apparatus in such a manner that the print job is to be executed in response to a user instruction which is issued after elimination of the interruption factor.

The present disclosure is also realizable by a process in which a program for realizing one or more functions of the above-described exemplary embodiment is supplied to a system or apparatus via a network or storage medium and one or more processors of a computer of the system or apparatus read and execute the program. Further, the present disclosure is also realizable by a circuit (e.g., application-specific integrated circuit (ASIC)) configured to realize one or more functions.

According to the present exemplary embodiment, the user is provided with a notification that the printing apparatus is currently in the state for executing the function for automatically cancelling a new print job immediately after the new print job is input.

There is a case in which it is desirable to cancel a new print job received in the state in which an interruption factor remains not eliminated, as the previously-input print job is cancelled. Thus, in the case in which a new print job is received after a print job is automatically cancelled based on a lapse of the designated time, if the interruption factor still remains not eliminated, an operation to cancel the new print job can be performed immediately before a lapse of another designated time.

Further, in the case in which the function as described above is implemented in the printing apparatus, the user is provided with a notification that the printing apparatus is currently in the state in which the function for automatically cancelling a new print job immediately after input of the new print job is executed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-073491, filed Apr. 5, 2018, which is hereby incorporated by reference herein in its entirety.

What is claimed is:

1. A printing apparatus comprising:
   a network interface capable of communicating with an external apparatus and configured to receive a print job from the external apparatus; and
   a controller capable of executing printing of the print job received by the network interface, wherein the controller has a function of automatically cancelling printing of the print job received by the network interface based on a state in which a predetermined interruption of printing of the print job remains unsolved continuing for a predetermined time or longer;
   wherein the controller causes the network interface to notify of information indicating that the printing apparatus is currently in a state in which a new print job to be newly received by the network interface is automatically cancelled by the cancelling function, and
   wherein according to the cancelling function, printing of the new print job received by the network interface in a state in which the information has been notified is cancelled before a lapse of the predetermined time after receiving the new print job.

2. The printing apparatus according to claim 1, wherein before a lapse of a designated time with the predetermined interruption remaining unsolved, the controller does not cause the network interface to notify of the information, and after a lapse of the designated time with the predetermined interruption remaining unsolved, the controller provides causes the network interface to notify of the information.

3. The printing apparatus according to claim 1, further comprising a display, wherein the controller displays the information on the display.

4. The printing apparatus according to claim 1, further comprising:
   an operation unit interface unit configured to receive an execution instruction to execute printing of a print job from a user; and
   a device interface configured to newly receive the new print job
   in a case where the operation unit interface has received the execution instruction,
   wherein the controller is further configured to, in a case where the execution instruction is received when the printing apparatus is in the state in which the new print job newly received is to be automatically cancelled, cause the display to notify that printing of the new print job is to be cancelled automatically.

5. The printing apparatus according to claim 1, wherein the automatically cancelling printing of the new print job indicates that printing of the new print job is cancelled without a user instruction to cancel the new print job.

6. The printing apparatus according to claim 1, wherein the execution unit is configured to
manage a print job list,
register the print job received by the network interface in the print job list, and
delete the print job from the print job list to cancel printing of the print job.

7. The printing apparatus according to claim 1, further comprising:
a printer configured to print an image on a sheet by using a toner cartridge,
wherein the predetermined interruption is a jam occurring when printing an image on a sheet by the printer or shortage of toner in the toner cartridge.

8. A printing apparatus comprising:
a network interface capable of communicating with an external apparatus and configured to receive a print job from the external apparatus; and
a controller capable of executing printing of the print job received by the network interface, wherein the controller has a function of automatically cancelling printing of the print job received by the network interface based on a state in which a predetermined interruption of printing of the print job remains unsolved continuing for a predetermined time or longer,
wherein the controller causes the network interface to notify of information indicating that the printing apparatus is currently in a state in which a new print job to be newly received by the network interface is automatically cancelled by the cancelling function, and
wherein the cancelling function is a function of automatically cancelling printing of a print job that has been received by the network interface before a time point at which a designated time or longer has passed with the predetermined interruption remaining unsolved and automatically cancelling printing of a print job that is newly received by the network interface in a state in which the designated time or longer has passed with the predetermined interruption remaining unsolved.

9. The printing apparatus according to claim 8, wherein before a lapse of the designated time with the predetermined interruption remaining unsolved, the controller does not cause the network interface to notify of the information, and after a lapse of the designated time with the predetermined interruption remaining unsolved, the controller causes the network interface to notify of the information.

10. The printing apparatus according to claim 8, further comprising a display, wherein the controller displays the information on the display.

11. The printing apparatus according to claim 10, further comprising:
an operation unit interface configured to receive an execution instruction to execute printing of a print job from a user; and
a device interface configured to newly receive the new print job in a case where the operation unit interface has received the execution instruction,
wherein the controller is further configured to, in a case where the execution instruction is received when the printing apparatus is in the state in which the new print job newly received is to be automatically cancelled, cause the display to notify that printing of the new print job is to be cancelled automatically.

12. The printing apparatus according to claim 8, wherein the automatically cancelling printing of the new print job indicates that printing of the new print job is cancelled without a user instruction to cancel the new print job.

13. A method of controlling a printing apparatus, the method comprising:
communicating by a network interface with an external apparatus;
receiving a print job from the external apparatus;
executing printing of the received print job by the network interface, wherein the executing automatically cancelling printing of the received print job by the network interface based on a state in which a predetermined interruption of printing of the print job remains unsolved continuing for a predetermined time or longer; and
notifying by the network interface of information indicating that the printing apparatus is currently in a state in which a new print job to be newly received by the network interface is automatically cancelled by the cancelling function, and
wherein according to the cancelling function, printing of the new print job received by the network interface in a state in which the information has been notified is cancelled before a lapse of the predetermined time after receiving the new print job.

14. The method according to claim 13, wherein before a lapse of a designated time with the predetermined interruption remaining unsolved, the notifying of the information is not performed, and after a lapse of the designated time with the predetermined interruption remaining unsolved, the notifying of the information is performed.

15. The method according to claim 13, wherein the notifying is performed by displaying the information on a display.

16. The method according to claim 13, wherein in the cancellation, for cancelling printing of a print job which is received while the information is displayed, the cancelling printing of the print job is performed before a lapse of a designated time after the print job has been received.

17. The method according to claim 13, wherein in the cancellation, automatically cancelling is performed for printing of a print job that has been received before a time point at which a designated time or longer passes with the predetermined interruption remaining unsolved, and for automatically cancelling printing of a print job that is newly received in a state in which the designated time or longer passes with the predetermined interruption remaining unsolved.

18. The method according to claim 13, further comprising
receiving an execution instruction to execute printing a print job from a user; and
receiving a new print job in a case where the execution instruction is received,
wherein in a case where the execution instruction is received when the printing apparatus is in the state in which the new print job newly received is to be automatically cancelled, cause the display to notify that printing of the new print job is to be cancelled automatically is provided.

19. The method according to claim 13, wherein the automatically cancelling printing of the new print job indicates that printing of the new print job is cancelled without a user instruction to cancel the new print job.

20. The method according to claim 13, wherein the executing includes
   managing a print job list,
   registering the received by the network interface print job in the print job list, and
   deleting the print job from the print job list to cancel printing of the print job.

\* \* \* \* \*